(12) United States Patent
Ueda et al.

(10) Patent No.: US 9,518,844 B2
(45) Date of Patent: Dec. 13, 2016

(54) ROTATION ANGLE DETECTION DEVICE COMPROMISING

(75) Inventors: Takeshi Ueda, Kashiba (JP); Hayato Komatsu, Ama-gun (JP); Yuji Kariatsumari, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 1082 days.

(21) Appl. No.: 13/639,294

(22) PCT Filed: Mar. 25, 2011

(86) PCT No.: PCT/JP2011/057404
§ 371 (c)(1),
(2), (4) Date: Oct. 4, 2012

(87) PCT Pub. No.: WO2011/129190
PCT Pub. Date: Oct. 20, 2011

(65) Prior Publication Data
US 2013/0035896 A1 Feb. 7, 2013

(30) Foreign Application Priority Data
Apr. 16, 2010 (JP) ................................. 2010-095080

(51) Int. Cl.
*G01D 5/245* (2006.01)
*G01D 5/244* (2006.01)

(52) U.S. Cl.
CPC .......... *G01D 5/2451* (2013.01); *G01D 5/2449* (2013.01)

(58) Field of Classification Search
CPC ........................... G01D 5/2451; G01D 5/2449
See application file for complete search history.

(56) References Cited

U.S. PATENT DOCUMENTS

| 5,461,311 A | 10/1995 | Nakazato et al. |
| 2002/0124663 A1 | 9/2002 | Tokumoto et al. |

(Continued)

FOREIGN PATENT DOCUMENTS

| CN | 101213729 A | 7/2008 |
| JP | A-06-323867 | 11/1994 |

(Continued)

OTHER PUBLICATIONS

International Search Report issued in Application No. PCT/JP2011/057404; Dated May 17, 2011 (With Translation).

*Primary Examiner* — Mohamed Charioui
*Assistant Examiner* — Catherine Rastovski
(74) *Attorney, Agent, or Firm* — Oliff PLC

(57) ABSTRACT

Angular widths of respective magnetic poles of a detection rotor are stored and divisions are set for respective magnetic pole pairs. Based on output signals from first and second magnetic sensors, a rotation angle computation unit computes first and second rotation angles that are rotation angles within the corresponding division. Based on the angular widths, the rotation angle computation unit identifies the magnetic pole sensed by the first magnetic sensor and computes a first absolute rotation angle using the first rotation angle. Based on the identified magnetic pole and the second rotation angle, the rotation angle computation unit computes a second absolute rotation angle. The rotation angle of the detection rotor is computed based on the first and second absolute angles.

4 Claims, 9 Drawing Sheets

(56) References Cited

U.S. PATENT DOCUMENTS

| | | | |
|---|---|---|---|
| 2008/0048654 A1* | 2/2008 | Takahashi | G01D 5/145 324/207.25 |
| 2008/0272723 A1 | 11/2008 | Rudel et al. | |
| 2009/0021246 A1* | 1/2009 | Uehira | B62D 15/0215 324/207.25 |
| 2009/0236930 A1* | 9/2009 | Nashiki | H02K 1/145 310/257 |
| 2011/0043197 A1* | 2/2011 | Trontelj | G01D 5/145 324/207.25 |

FOREIGN PATENT DOCUMENTS

| | | |
|---|---|---|
| JP | A-2002-257649 | 9/2002 |
| JP | A-2003-083823 | 3/2003 |
| JP | A-2006-208025 | 8/2006 |
| JP | A-2009-503462 | 1/2009 |

\* cited by examiner

FIG. 5A

| POLE NUMBER | PEAK VALUE | ANGULAR WIDTH | COMPENSATION GAIN G1 |
|---|---|---|---|
| 0 | +490 | 170deg | 500/490 |
| 1 | -485 | 165deg | 500/485 |
| 2 | +480 | 160deg | 500/480 |
| 3 | -490 | 170deg | 500/490 |
| 4 | +485 | 165deg | 500/485 |
| 5 | -510 | 190deg | 500/510 |
| 6 | +520 | 195deg | 500/520 |
| 7 | -520 | 195deg | 500/520 |
| 8 | +525 | 200deg | 500/525 |
| 9 | -510 | 190deg | 500/510 |

FIG. 5B

| POLE NUMBER | PEAK VALUE | ANGULAR WIDTH | COMPENSATION GAIN G2 |
|---|---|---|---|
| 0 | +490 | 170deg | 500/490 |
| 1 | -485 | 165deg | 500/485 |
| 2 | +480 | 160deg | 500/480 |
| 3 | -490 | 170deg | 500/490 |
| 4 | +485 | 165deg | 500/485 |
| 5 | -510 | 190deg | 500/510 |
| 6 | +520 | 195deg | 500/520 |
| 7 | -520 | 195deg | 500/520 |
| 8 | +525 | 200deg | 500/525 |
| 9 | -510 | 190deg | 500/510 |

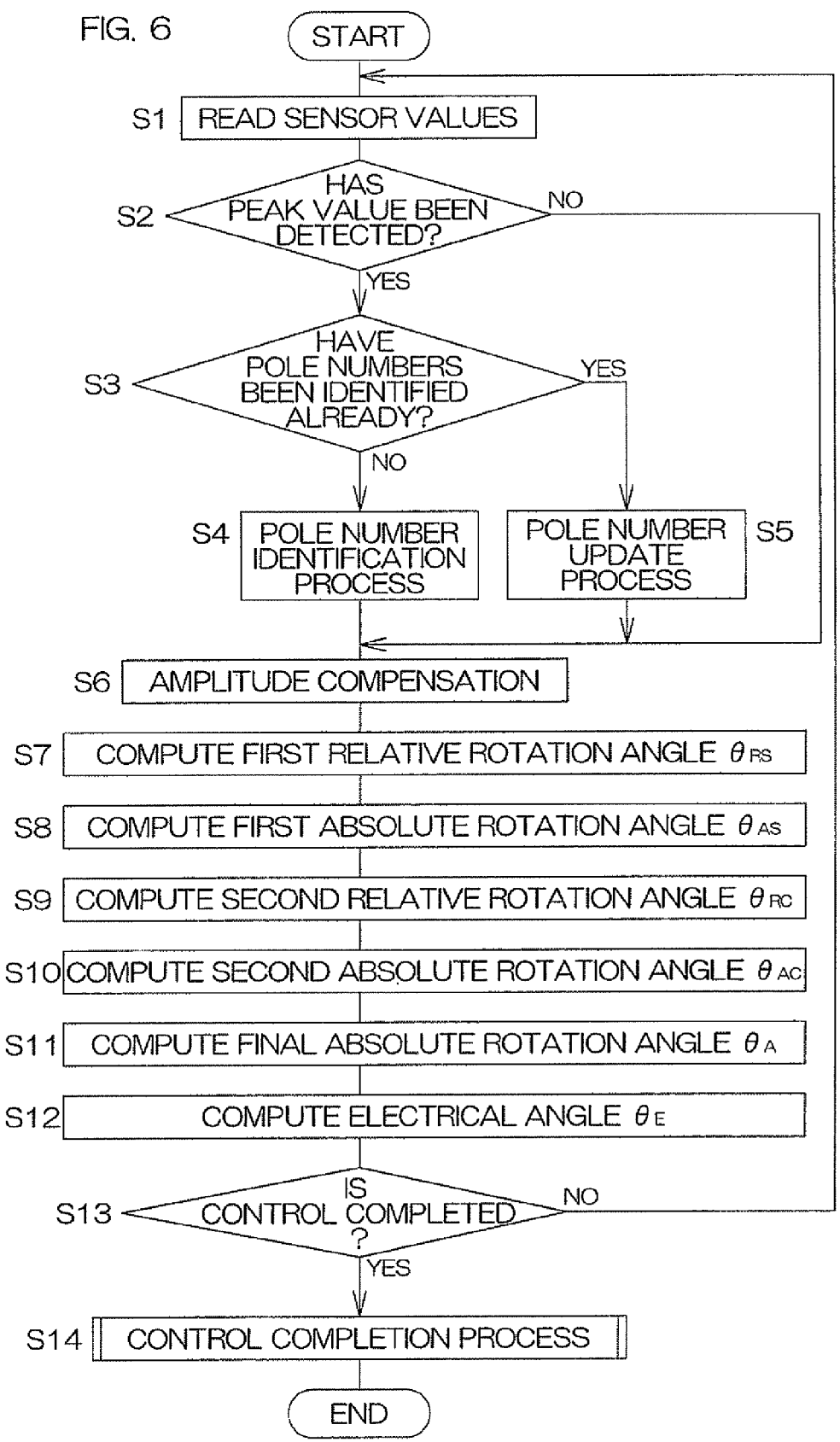

ROTATION ANGLE DETECTION DEVICE COMPROMISING

TECHNICAL FIELD

The present invention relates to a rotation angle detection device that detects a rotation angle of a rotating body.

BACKGROUND ART

A brushless motor used in an electric power steering apparatus, etc., is controlled by supplying an electric current to a stator coil in accordance with a rotation angle of a rotor. There is thus known a rotation angle detection device that uses a detection rotor that rotates in accordance with rotation of the brushless motor to detect the rotation angle of the rotor of the brushless motor. Specifically, as shown in FIG. 10, a detection rotor 101 (hereinafter referred to as the "rotor 101") includes a cylindrical magnet 102 having a plurality of magnetic pole pairs corresponding to magnetic pole pairs provided in a rotor of a brushless motor. At a periphery of the rotor 101, two magnetic sensors 121 and 122 are disposed at a predetermined angular interval centered at a central rotation axis of the rotor 101. Sinusoidal signals with a predetermined phase difference are output from the respective magnetic sensors 121 and 122. The rotation angle of the rotor 101 (rotation angle of the rotor of the brushless motor) is detected based on the two sinusoidal signals.

In the present example, the magnet 102 has five magnetic pole pairs. That is, the magnet 102 has ten magnetic poles disposed at equiangular intervals. Each magnetic pole is disposed at an angular interval of 36° (180° as electrical angle) centered at the central rotation axis of the rotor 101. Also, the two magnetic sensors 121 and 122 are disposed at an angular interval of 18° (90° as electrical angle) centered at the central rotation axis of the rotor 101.

A direction indicated by an arrow in FIG. 10 shall be deemed to be a positive direction of rotation of the detection rotor 101. It shall also be deemed that the rotation angle of the rotor 101 increases when the rotor 101 is rotated in the positive direction, and the rotation angle of the rotor 101 decreases when the rotor 101 is rotated in the opposite direction. The sinusoidal signals V1 and V2, with each of which a single cycle is a period in which the rotor 101 rotates by an angle corresponding to a single magnetic pole pair (72° (360° as electrical angle)), are output from the respective magnetic sensors 121 and 122 as shown in FIG. 11.

Here, an absolute rotation angle of the rotor 101 from a predetermined reference position shall be deemed to be the absolute rotation angle (rotation angle in accordance with the mechanical angle) $\theta_A$ of the rotor 101. An angular range of a single rotation of the rotor 101 shall be divided into five divisions corresponding to the five magnetic pole pairs, and an angle of the rotor 101 with a start position of each division being expressed as 0° and an end position being expressed as 360° shall be deemed to be a relative rotation angle $\theta_R$ of the rotor 101. In the present case, the ten magnetic poles are equal in angular width and thus the relative rotation angle $\theta_R$ of the rotor 101 matches the electrical angle of the rotor of the brushless motor.

Here, it shall be deemed that the output signal V1=A1·sin $\theta_R$ is output from the first magnetic sensor 121 and the output signal V2=A2·cos $\theta_R$ is output from the second magnetic sensor 122. A1 and A2 are amplitudes. If the amplitudes A1 and A2 of the two output signals V1 and V2 are deemed to be equal, the relative rotation angle $\theta_R$ of the rotor 101 can be determined based on the following formula (1) using the two output signals V1 and V2.

$$\theta_R = \tan^{-1}(\sin\theta_R / \cos\theta_R) \quad (1)$$
$$= \tan^{-1}(V1/V2)$$

The brushless motor is controlled using the relative rotation angle $\theta_R$ thus determined.

In a case where the absolute rotation angle $\theta_A$ of the rotor 101 is equal to a mechanical angle of the rotor 101 from a predetermined reference position, the absolute rotation angle $\theta_A$ of the rotor 101 can be determined based on, for example, the following formula (2) and using the relative rotation angle $\theta_R$.

$$\theta_A = \{\theta_R + 360 \times (j-1)\}/5 (j=1,2,\ldots 5) \quad (2)$$

CITATION LIST

Patent Literature

Patent Document 1: Japanese Published Unexamined Patent Application No. 2006-208025

SUMMARY OF THE INVENTION

Technical Problem

In using a conventional rotation angle detection device such as that described above for detecting a rotation angle of a rotor of a brushless motor, the number of magnetic poles of the detection rotor 101 and the number of magnetic poles of the brushless motor are preferably made equal in order to detect an electrical angle, used for control of the brushless motor, at high precision. However, as the number of magnetic poles to be magnetized in the detection rotor 101 increases, variation arises in the angular widths of the respective magnetic poles due to magnetization error. Variation in the angular widths of the respective magnetic poles leads to error in the rotation angle detected by the rotation angle detection device.

An object of the present invention is to provide a rotation angle detection device capable of detecting a rotation angle of a rotating body at high precision even when there is variation in the angular widths of the respective magnetic poles provided in a detection rotor.

Solution to the Problem

A rotation angle detection device according to the present invention includes a detection rotor (1) rotating in accordance with rotation of a rotating body (10) and provided with a plurality of magnetic poles (M0 to M9), a first magnetic sensor (21) outputting, in accordance with the rotation of the detection rotor, a first output signal (V1=A1·sin θ) that is a sinusoidal signal serving as a reference, and a second magnetic sensor (22) outputting, in accordance with the rotation of the detection rotor, a second output signal (V2=A2·cos θ) that is a sinusoidal signal having a predetermined phase difference with respect to the first output signal, detects a rotation angle of the rotating body based on the output signals of the magnetic sensors, and further includes a storage unit (20) configured to store angular widths of the respective magnetic poles measured in advance, a unit (20) configured to set, for each magnetic pole pair of the plurality of magnetic poles, a division corresponding to an angular width of the magnetic pole pair, a magnetic pole identification unit (20, S2 to S5) configured to identify, based on the first output signal, a magnetic pole sensed by the first magnetic sensor, a first computation unit (20, S7) configured to compute, based on the first output signal, a first rotation angle ($\theta_{RS}$) that is a rotation angle within the division, a second computation unit (20, S9) configured to compute, based on the second output signal, a second rotation angle ($\theta_{RC}$) that is a rotation angle within the division, a third computation unit (20, S8) configured to compute a first absolute rotation angle ($\theta_{AS}$) of the detection rotor based on the first rotation angle computed by the first computation unit, the angular widths of the respective magnetic poles stored in the storage unit, and the magnetic pole identified by the magnetic pole identifying unit, a fourth computation unit (20, S10) configured to compute a second absolute rotation angle ($\theta_{AC}$) of the detection rotor based on the second rotation angle computed by the second computation unit, the angular widths of the respective magnetic poles stored in the storage unit, and the magnetic pole identified by the magnetic pole identifying unit, and a fifth computation unit (20, S11, S12, S31, S32, S12A) configured to compute a rotation angle ($\theta_E$) of the rotating body based on the first absolute rotation angle computed by the third computation unit and the second absolute rotation angle computed by the fourth computation unit. The alphanumeric characters in parenthesis express corresponding components in preferred embodiments described below. However, this is not intended for the present invention to be interpreted as being limited to the preferred embodiments.

With the above arrangement, the magnetic pole sensed by the first magnetic sensor is identified based on the first output signal. The first rotation angle (first relative rotation angle) that is the rotation angle within the magnetic pole pair division is computed based on the first output signal. The first absolute rotation angle of the detection rotor is computed based on the first rotation angle, the angular widths of the respective magnetic poles, and the magnetic pole sensed by the first magnetic sensor. The absolute rotation angle can thereby be computed accurately from the first rotation angle even if there is variation in the angular widths of the plurality of magnetic poles provided in the detection rotor. Also, the second rotation angle (second relative rotation angle) that is the rotation angle within the magnetic pole pair division is computed based on the second output signal. The second absolute rotation angle of the detection rotor is computed based on the second rotation angle, the angular widths of the respective magnetic poles, and the magnetic pole sensed by the first magnetic sensor. The absolute rotation angle can thereby be computed accurately from the second rotation angle even if there is variation in the angular widths of the plurality of magnetic poles provided in the detection rotor. The rotation angle of the rotating body is computed based on the first absolute rotation angle and the second absolute rotation angle. The rotation angle of the rotating body can thereby be detected at high precision even if there is variation in the angular widths of the respective magnetic poles.

In a preferred embodiment according to the present invention, the fifth computation unit includes a unit configured to switch, based on a signal value of the first output signal and a signal value of the second output signal, a method for computing the rotation angle of rotating body based on the first absolute rotation angle and the second absolute rotation angle. With this arrangement, the method for computing the rotation angle of the rotating body based on the first absolute rotation angle and the second absolute rotation angle is switched based on the signal value of the first output signal and the signal value of the second output signal. The rotation angle of the rotating body can thereby be computed by an appropriate computing method that is in accordance with the signal value of the first output signal and the signal value of the second output signal.

In a preferred embodiment according to the present invention, the phase difference between the first output signal and the second output signal is 90° (90° as relative rotation angle), the first computation unit computes the first rotation angle based on the first output signal and a polarity of the second output signal, the second computation unit computes the second rotation angle based on the second output signal and a polarity of the first output signal, and the fifth computation unit includes a unit (20, S11, S12) configured to compute the rotation angle of the rotating body based on the second absolute rotation angle computed by the fourth computation unit when the first output signal is near an extremism, a unit (20, S11, S12) configured to compute the rotation angle of the rotating body based on the first absolute rotation angle computed by the third computation unit when the second output signal is near an extremum, and a unit (20, S11, S12) configured to compute the rotation angle of the rotating body based on one of either or both of the first absolute rotation angle computed by the third computation unit and the second absolute rotation angle computed by the fourth computation unit when neither the first output signal nor the second output signal is near an extremum.

With this arrangement, the first rotation angle (first relative rotation angle) is computed based on the first output signal and the polarity of the second output signal. The polarity of the second output signal becomes inverted at a zero cross position of the second output signal as a boundary. Thus, when a peak position of the first output signal and the zero cross position of the second output signal are shifted, an error may occur in the first rotation angle near the peak position of the first output signal.

Thus, when the first output signal is near an extremum, the rotation angle of the rotating body is computed based on the second absolute rotation angle computed by the fourth computation unit. That is, when the first output signal is near the extremum, the rotation angle of the rotating body is computed not using the first absolute rotation angle that is computed based on the first rotation angle in which there is a possibility of occurrence of error, but using the second absolute rotation angle. The rotation angle of the rotating body can thereby be computed with high precision even when the peak position of the first output signal and the zero cross position of the second output signal are shifted.

Also, the second rotation angle (second relative rotation angle) is computed based on the second output signal and the polarity of the first output signal. The polarity of the first output signal becomes inverted at a zero cross position of the first output signal as a boundary. Thus, when a peak position of the second output signal and the zero cross position of the first output signal are shifted, an error may occur in the second rotation angle near the peak position of the second output signal.

Thus, when the second output signal is near an extremum, the rotation angle of the rotating body is computed based on the first absolute rotation angle computed by the third computation unit. That is, when the second output signal is near the extremum, the rotation angle of the rotating body is computed not using the second absolute rotation angle that is computed based on the second rotation angle in which there is a possibility of occurrence of error, but using the first absolute rotation angle. The rotation angle of the rotating body can thereby be computed with high precision even when the peak position of the second output signal and the zero cross position of the first output signal are shifted.

In a case where neither the first output signal nor the second output signal is near an extremum, the rotation angle of the rotating body is computed based on one of either or both of the first absolute rotation angle computed by the third computation unit and the second absolute rotation angle computed by the fourth computation unit. In a case where the rotation angle of the rotating body is computed based on both the first absolute rotation angle and the second absolute rotation angle, the rotation angle of the rotating body is computed by taking an average of the first absolute rotation angle and the second absolute rotation angle or adding the two upon applying weights to each.

In a preferred embodiment of the present invention, the fifth computation unit includes a unit (20, S31) configured to compute, as a third output signal value, a value (sin ($\theta_{AB}$)) that is in accordance with a first output signal value corresponding to the first absolute rotation angle, a unit (20, S32) configured to compute, as a fourth output signal value, a value (cos($\theta_{AC}$)) that is in accordance with a second output signal value corresponding to the second absolute rotation angle, and a unit (20, S12A) configured to compute the rotation angle of the rotating body based on the third output signal value and the fourth output signal value.

With this arrangement, the value that is in accordance with the first output signal value corresponding to the first absolute rotation angle is computed as the third output signal value. Also, the value that is in accordance with the second output signal value corresponding to the second absolute rotation angle is computed as the fourth output signal value. The rotation angle of the rotating body is then computed based on the third output signal value and the fourth output signal value.

In a preferred embodiment of the present invention, the magnetic pole identification unit includes a detection unit (20, S2) configured to detect an extremum of the first output signal and a unit (20, S3 to S5) configured to identify the magnetic pole sensed by the first magnetic sensor based on the extremum detected by the detection unit and extremum data set in advance.

With this arrangement, the extremum of the first output signal is detected by the detection unit. The magnetic pole sensed by the first magnetic sensor is identified based on the extremum detected by the detection unit and the extremum data set in advance.

The above and yet other objects, features, and effects of the present invention shall be made clearer by the following description of the preferred embodiments with reference to the attached drawings.

BRIEF DESCRIPTION OF THE DRAWINGS

FIG. 5A is a schematic view of contents of an amplitude compensation table corresponding to the first magnetic sensor, and FIG. 5B is a schematic view of contents of an amplitude compensation table corresponding to the second magnetic sensor.

FIG. 6 is a flowchart of a procedure of a rotation angle computation process performed by a rotation angle computation device.

DESCRIPTION OF EMBODIMENTS

Preferred embodiments with which the present invention is applied to a rotation angle detection device for detecting a rotation angle of a rotor of a brushless motor shall now be described in detail with reference to the attached drawings.

Figure 1:
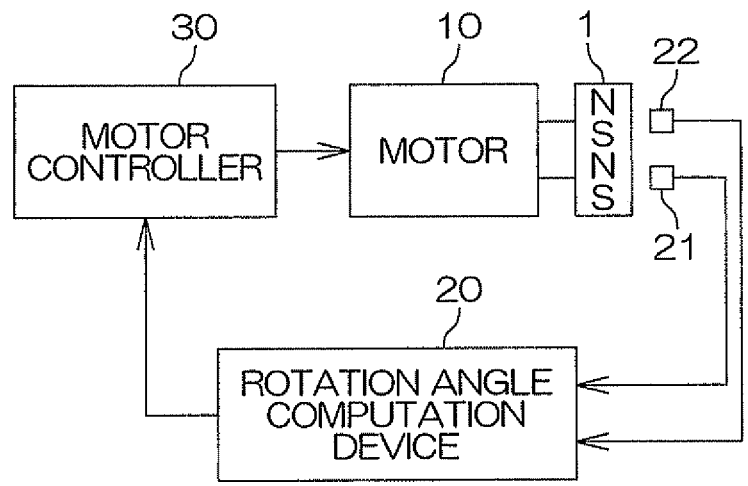
FIG. 1 is a schematic view of an arrangement in which a rotation angle detection device according to a first preferred embodiment of the present invention is applied to a rotation angle detection device for detecting a rotation angle of a rotor of a brushless motor.

FIG. 1 is a schematic view of an arrangement in which a rotation angle detection device according to a first preferred embodiment of the present invention is applied to a rotation angle detection device for detecting a rotation angle of a rotor of a brushless motor.

Figure 2:
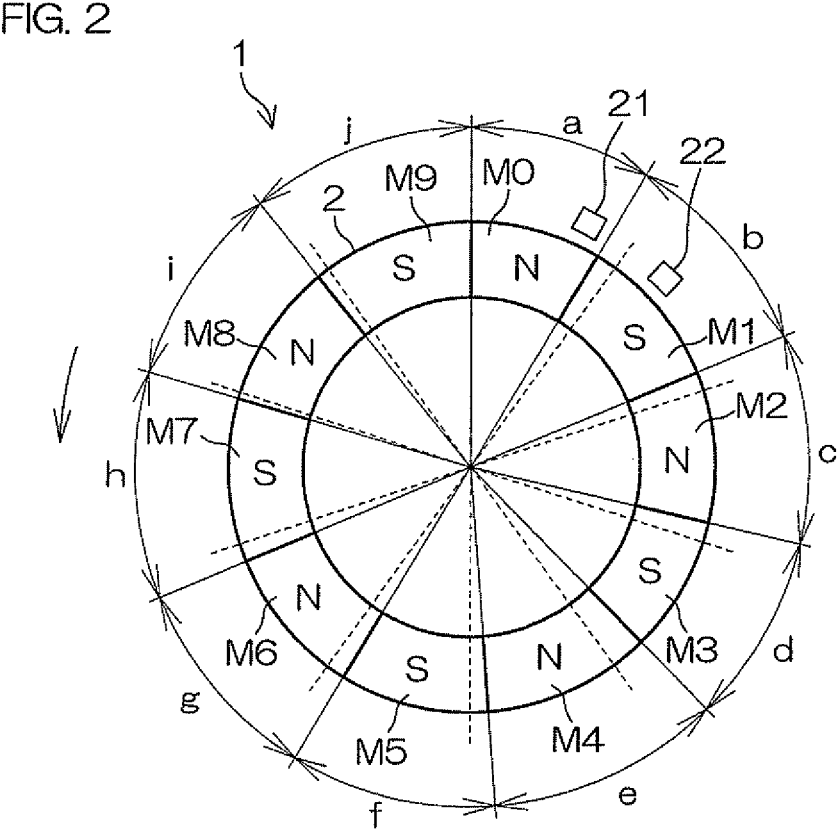
FIG. 2 is a schematic view of an arrangement of a detection rotor.

The rotation angle detection device includes a detection rotor (hereinafter referred to simply as the "rotor 1") that rotates in accordance with rotation of a brushless motor 10. As shown in FIG. 2, the rotor 1 includes a cylindrical magnet 2 having a plurality of magnetic pole pairs corresponding to magnetic pole pairs provided in a rotor of the brushless motor 10. That is, the rotor 1 is provided with a plurality of magnetic poles aligned in a circumferential direction. In the present example, the magnet 2 has five magnetic pole pairs, (M0, M1) (M2, M3), (M4, M5), (M6, M7), and (M8, M9). That is, the magnet 2 has ten magnetic poles M0 to M9.

All of the respective magnetic poles provided in the rotor of the brushless motor 10 have the same length in the circumferential direction. That is, all of the respective magnetic poles provided in the rotor of the brushless motor 10 have the same angular width of 36°. Thus, with the brushless motor 10, an angular width of a single magnetic pole pair is 72° as a mechanical angle and this corresponds to an electrical angle of 360°. Meanwhile, as shown in FIG. 2, there are variations, due to magnetization error, in the angular widths a to j of the respective magnetic poles M0 to M9 provided in rotor 1. Put another way, there are variations in magnetization areas of the respective magnetic poles M0 to M9. In the present example, the angular widths (a, c, e, g, and i) of the N pole magnetic poles M0, M2, M4, M6, and M8 differ respectively. Of the S pole magnetic poles M1, M3, M5, M7, and M9, the four magnetic poles M1, M3, M5, and M7 besides the magnetic pole M9 differ respectively. The angular width (j) of the magnetic pole M9 is equal to the angular width (f) of the magnetic pole M5.

In the present preferred embodiment, the angular widths of the respective magnetic poles M0 to M9 are set as shown in Table 1. In Table 1, each angular width is expressed by multiplying the mechanical angle corresponding to the angular width by the number of magnetic pole pairs ("5" in the present preferred embodiment). In FIG. 2, broken lines indicate respective regions in a case where the rotor 1 is divided at intervals of 36° in a circumferential direction (180° as the electrical angle).

TABLE 1

| Magnetic Pole | Angular width (deg) |
|---|---|
| M0 | 170 |
| M1 | 165 |
| M2 | 160 |
| M3 | 170 |
| M4 | 165 |
| M5 | 190 |
| M6 | 195 |
| M7 | 195 |
| M8 | 200 |
| M9 | 190 |

At a periphery of the rotor 1, two magnetic sensors 21 and 22 are disposed at an angular interval of a predetermined angle (18° (90° as the electrical angle)) centered at a central rotation axis of the rotor 1. The two magnetic sensors 21 and 22 may be referred to as the first magnetic sensor 21 and the second magnetic sensor 22, respectively, in some cases. As the magnetic sensors, for example, Hall elements, magnetoresistive elements (MR elements), or other elements having a characteristic of changing in electrical characteristic due to action of a magnetic field, may be used.

Figure 3:
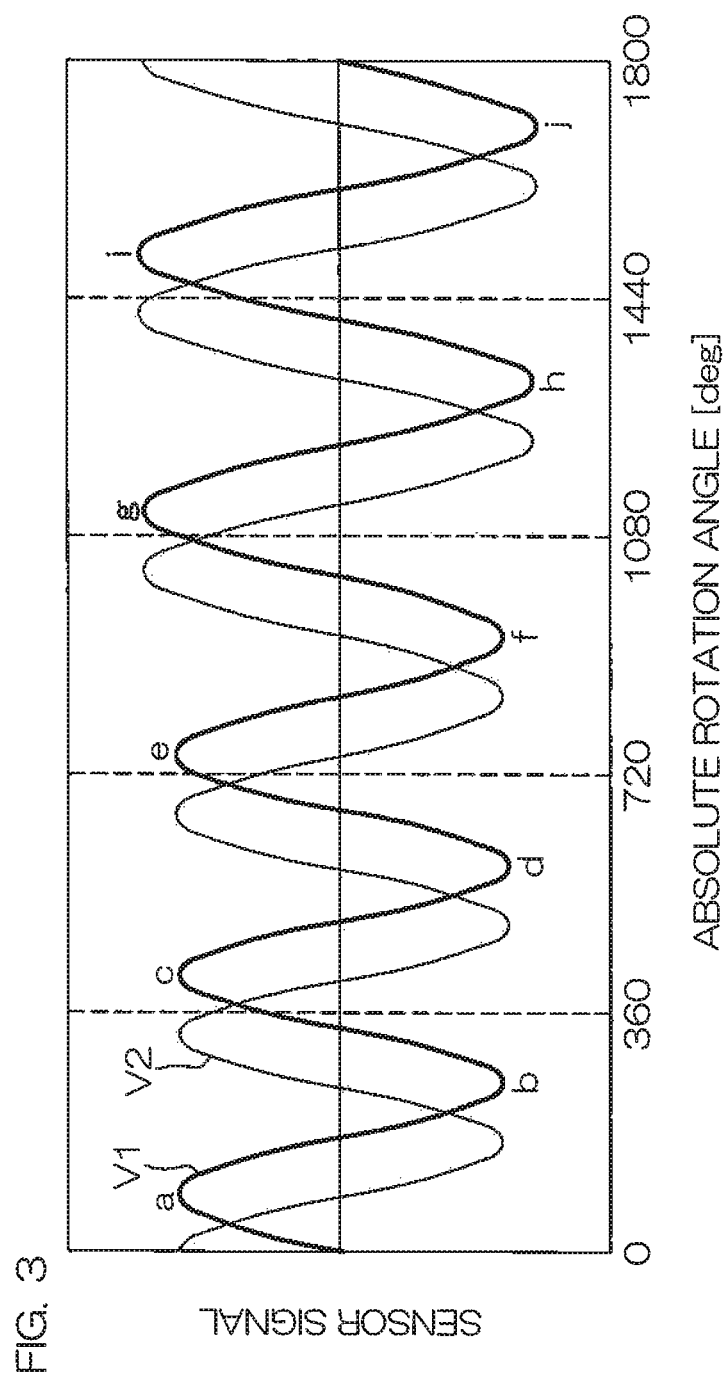
FIG. 3 is a schematic view of an output signal waveform of a first magnetic sensor and an output signal waveform of a second magnetic sensor.

A direction indicated by the arrow in FIG. 2 shall be deemed to be a positive direction of rotation of the rotor 1. It shall also be deemed that the rotation angle of the rotor 1 increases when the rotor 1 is rotated in the positive direction, and the rotation angle of the rotor 1 decreases when the rotor 1 is rotated in the opposite direction. As shown in FIG. 3, signals of sinusoidal form (hereinafter referred to as "sinusoidal signals") V1 and V2 are output from the respective magnetic sensors 21 and 22 in accordance with the rotation of the rotor 1. In FIG. 3, a rotor angle [deg] of an x-axis expresses an angle (absolute rotation angle $\theta_A$ described below) obtained by multiplying the mechanical angle by the number of magnetic pole pairs ("5" in the present preferred embodiment). Also, in FIG. 3, near the respective peak values (extremum: maximum value or minimum value) of the sinusoidal signal V1, regions a to j of the magnetic poles sensed by the first magnetic sensor 21 at the respective points are indicated.

When the rotor 1 rotates by an angle corresponding to a single magnetic pole, sinusoidal signals of a half cycle are output from the respective magnetic sensors 21 and 22. However, in the present preferred embodiment, the angular widths of the respective magnetic poles are not of fixed width and thus in the sinusoidal signal output from a magnetic sensor, the half-cycles corresponding to the respective magnetic poles are not fixed. Also, with the exception of the magnetic pole M5 and the magnetic pole M9, the peak values, corresponding to the respective magnetic poles, of the output signals V1 and V2 of the respective magnetic sensors 21 and 22 differ according to magnetic pole.

An absolute rotation angle of the rotor 1 from a predetermined reference position shall be deemed to be the absolute rotation angle $\theta_A$ of the rotor 1. However, in the present preferred embodiment, the absolute rotation angle $\theta_A$ of the rotor 1 is a value with which a mechanical angle of the rotor 1 from a predetermined reference position is multiplied by the number of magnetic pole pairs ("5" in the present preferred embodiment). The mechanical angle of the rotor 1 from the predetermined reference position is thus the value obtained by dividing the absolute rotation angle $\theta_A$ by the number of magnetic pole pairs ("5" in the present preferred embodiment).

An angular range of a single rotation of the rotor 1 shall be divided into five divisions (a+b, c+d, e+f, g+h, and i+j) in correspondence to the angular widths of the five magnetic pole pairs, a start position of each division shall be deemed to be 0°, an end position of each division shall be deemed to be 360°, and an angle corresponding to the absolute rotation angle $\theta_A$ and expressed in the range of 0 to 360° shall be deemed to be a relative rotation angle $\theta_R$ of the rotor 1. In the present preferred embodiment, the angular widths of the five divisions are not of fixed width.

Here, it shall be deemed that a sinusoidal signal V1 ($=A1 \cdot \sin \theta_R$) that serves as a reference is output from the first magnetic sensor 21 at each division corresponding to each of the five magnetic pole pairs and a sinusoidal signal V2 ($=A2 \cdot \sin(\theta_R+90°)=A2 \cdot \cos \theta_R$), having a phase difference of 90° as relative rotation angle with respect to the signal V1, is output from the second magnetic sensor 22 at each division corresponding to each of the five magnetic pole pairs. A1 and A2 respectively express amplitudes. However, the amplitude A1 changes according to the angular width of the magnetic poles sensed by the first magnetic sensor 21. Likewise, the amplitude A2 also changes according to the angular width of the magnetic poles sensed by the second magnetic sensor 22. Also, $\theta_R$ expresses the relative rotation angle $\theta_R$ in the corresponding division. The output signal V1 of the first magnetic sensor 21 may be referred to at times as the first output signal V1, and the output signal V2 of the second magnetic sensor 22 may be referred to at times as the second output signal V2.

As shall be described later, the output signals V1 and V2 are normalized (amplitude-compensated) so that the amplitudes A1 and A2 according to the magnetic poles respectively become A. The normalized (amplitude-compensated) first output signal shall be expressed as V1'=$A \cdot \sin \theta_R$ and the normalized (amplitude-compensated) second output signal shall be expressed as V2'=$A \cdot \cos \theta_R$. By determining $\sin^{-1}$ (V1'/A) from the amplitude-compensated first output signal V1', the relative rotation angle $\theta_R$ (hereinafter referred to as the "first relative rotation angle $\theta_{RS}$") in the corresponding division can be determined. The first relative rotation angle $\theta_{RS}$ can be determined based on the following formula (3).

$$\theta_{RS} = \sin^{-1}(V1'/A) + \alpha \qquad (3)$$

Here, $\sin^{-1}$ (V1'/A) is determined as an angle within a range of 0° to 90° or 270° to 360°. Also, $\alpha$ is a variable that is determined according to a polarity (positive or negative) of the output signal V2 of the second magnetic sensor 22.

Figure 4A:
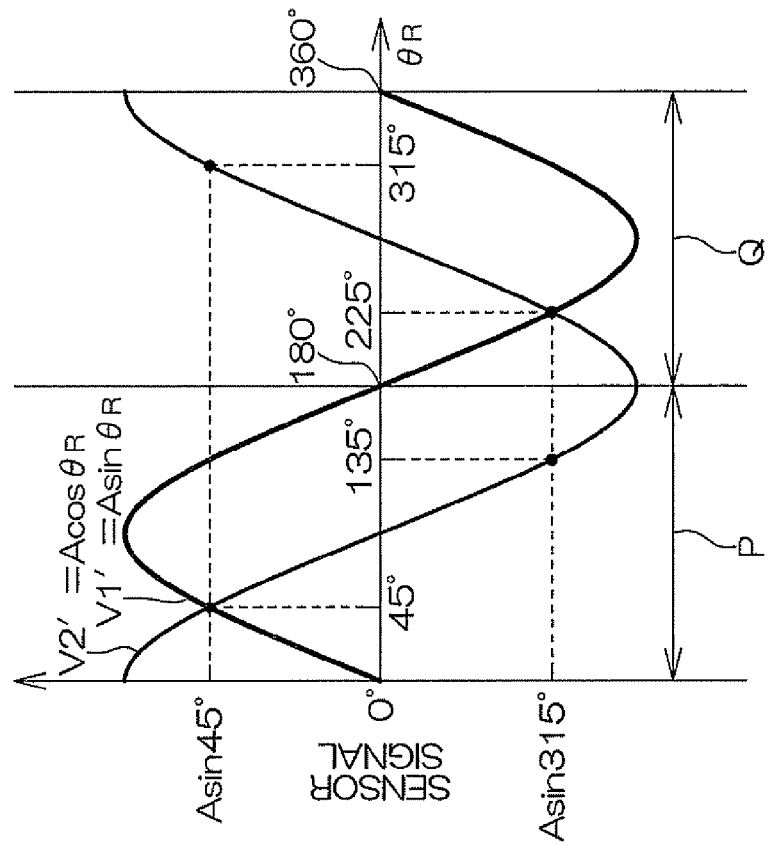
FIG. 4A is an explanatory diagram for describing a method for computing a first relative rotation angle.

As shown in FIG. 4A, in a case where the value of the amplitude-corrected first output signal V1' is positive as in $A \cdot \sin 45°$, the rotation angles corresponding to $\sin^{-1}$ (V1'/A) are the two angles of the corresponding rotation angle (for example, 45°) within a range P1 of the relative rotation angle $\theta_R$ of 0° to 90° and the corresponding rotation angle (for example, 135°) within a range P2 of the relative rotation angle $\theta_R$ of 90° to 180°. That is, in the case where the value of the amplitude-corrected first output signal V1' is positive, it is unknown whether the actual relative rotation angle $\theta_R$ is in the region P1 or in the region P2 from just determining the rotation angles corresponding to $\sin^{-1}(V1'/A)$. Thus, in the present preferred embodiment, whether the actual relative rotation angle $\theta_R$ is in the region P1 or in the region P2 is judged based on the polarity of the amplitude-corrected second output signal V2'. That is, if the polarity of the amplitude-corrected second output signal V2' is positive, it is judged that the actual relative rotation angle $\theta_R$ is in the region P1 and if the polarity of the amplitude-corrected second output signal V2' is negative, it is judged that the actual relative rotation angle $\theta_R$ is in the region P2.

Referring to formula (3), in the case where the value of the amplitude-corrected first output signal V1' is positive, the rotation angle computation device 20 determines the rotation angle corresponding to $\sin^{-1}(V1'/A)$ as being a rotation angle within the region P1. If the polarity of the amplitude-corrected second output signal V2' is positive, the rotation angle computation device 20 sets $\alpha$ to $\alpha=0$ and if the polarity of the amplitude-corrected second output signal V2' is negative, the rotation angle computation device 20 sets $\alpha$ to $\alpha=180°-2\cdot\sin^{-1}(V1'/A)$.

On the other hand, in a case where the value of the amplitude-corrected first output signal V1' is negative as in the case of $A\cdot\sin 315°$, the rotation angles corresponding to $\sin^{-1}(V1'/A)$ are the two angles of the corresponding rotation angle (for example, 225°) within a range Q1 of the relative rotation angle $\theta_R$ of 180° to 270° and the corresponding rotation angle (for example, 315°) within a range Q2 of the relative rotation angle $\theta_R$ of 270° to 360°. That is, in the case where the value of the amplitude-corrected first output signal V1' is negative, it is unknown whether the actual relative rotation angle $\theta_R$ is in the region Q1 or in the region Q2 from just determining the rotation angles corresponding to $\sin^{-1}(V1'/A)$. Thus, in the present preferred embodiment, whether the actual relative rotation angle $\theta_R$ is in the region Q1 or in the region Q2 is judged based on the polarity of the amplitude-corrected second output signal V2'. That is, if the polarity of the amplitude-corrected second output signal V2' is positive, it is judged that the actual relative rotation angle $\theta_R$ is in the region Q2 and if the polarity of the amplitude-corrected second output signal V2' is negative, it is judged that the actual relative rotation angle $\theta_R$ is in the region Q1.

Referring to formula (3), in the case where the value of the amplitude-corrected first output signal V1' is negative, the rotation angle computation device 20 determines the rotation angle corresponding to $\sin^{-1}(V1'/A)$ as being a rotation angle within the region Q2. If the polarity of the amplitude-corrected second output signal V2' is positive, the rotation angle computation device 20 sets $\alpha$ to $\alpha=0$ and if the polarity of the amplitude-corrected second output signal V2' is negative, the rotation angle computation device 20 sets $\alpha$ to $\alpha=540°-2\cdot\sin^{-1}(V1'/A)$.

By determining $\cos^{-1}(V2'/A)$ from the amplitude-corrected second output signal V2', the relative rotation angle $\theta_R$ (hereinafter referred to as the "second relative rotation angle $\theta_{RC}$") in the corresponding division can be determined. The second relative rotation angle $\theta_{RC}$ can be determined based on the following formula (4).

$$\theta_{RC} = \cos^{-1}(V2'/A) + \beta \quad (4)$$

Here, $\cos^{-1}(V2'/A)$ is determined as an angle within a range of 0° to 180°. Also, $\beta$ is a variable that is determined according to a polarity (positive or negative) of the amplitude-corrected first output signal V1'.

Figure 4B:
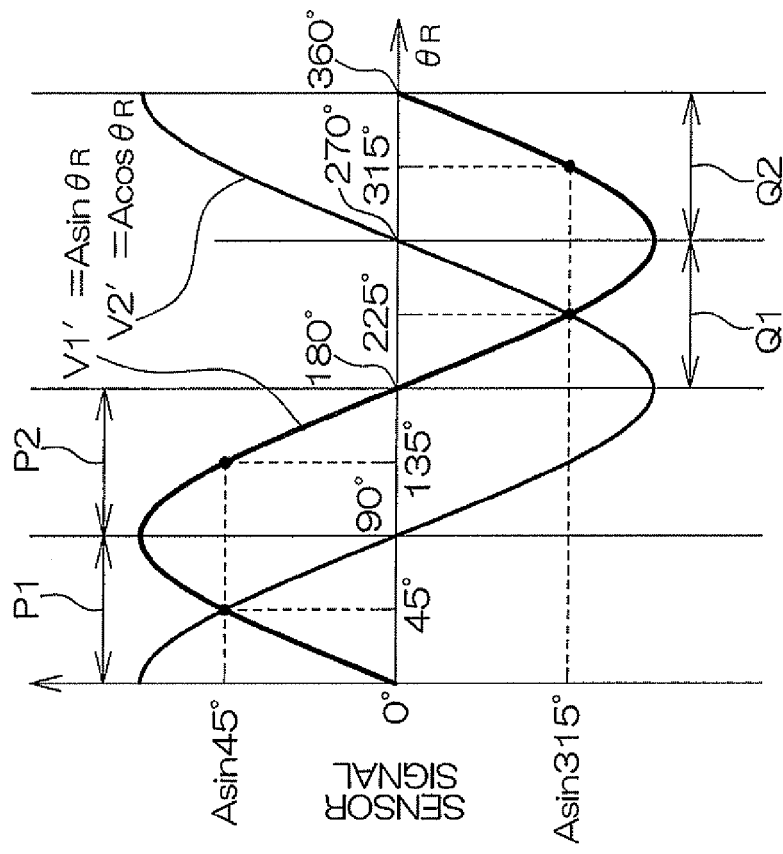
FIG. 4B is an explanatory diagram for describing a method for computing a second relative rotation angle.

As shown in FIG. 4B, in a case where the value of the amplitude-corrected second output signal V2' is positive, for example, as in $A\cdot\cos 45°$ or negative, for example, as in $A\cdot\cos 135°$, the rotation angles corresponding to $\cos^{-1}(V2'/A)$ are the two rotation angles of the corresponding rotation angle (for example, 45° or 135°) within a range P of the relative rotation angle $\theta_R$ of 0° to 180° and the corresponding rotation angle (for example, 315° or 225°) within a range Q of the relative rotation angle $\theta_R$ of 180° to 360°. That is, it is unknown whether the actual relative rotation angle $\theta_R$ is in the region P or in the region Q from just determining the rotation angles corresponding to $\cos^{-1}(V1'/A)$. Thus, in the present preferred embodiment, whether the actual relative rotation angle $\theta_R$ is in the region P or in the region Q is judged based on the polarity of the amplitude-corrected first output signal V1'. That is, if the polarity of the amplitude-corrected first output signal V1' is positive, it is judged that the actual relative rotation angle $\theta_R$ is in the region P and if the polarity of the amplitude-corrected first output signal V1' is negative, it is judged that the actual relative rotation angle $\theta_R$ is in the region Q.

Referring to formula (4), the rotation angle computation device 20 determines the rotation angle corresponding to $\cos^{-1}(V2'/A)$ as being a rotation angle within the region P. If the polarity of the amplitude-corrected first output signal V1' is positive, the rotation angle computation device 20 sets $\beta$ to $\beta=0$ and if the polarity of the amplitude-corrected first output signal V1' is negative, the rotation angle computation device 20 sets $\beta$ to $\beta=360°-2\cdot\cos^{-1}(V2'/A)$.

Returning to FIG. 1, the output signals V1 and V2 of the respective magnetic sensors 21 and 22 are input into the rotation angle computation device 20. The rotation angle computation device 20 computes the first relative rotation angle $\theta_{RS}$ of the rotor 1 based on the first output signal V1 and computes the first absolute rotation angle (corresponding to mechanical angle×number of magnetic pole pairs in the present example) $\theta_{AS}$ of the rotor 1 based on the obtained first relative rotation angle $\theta_{RS}$, etc. Also, the rotation angle computation device 20 computes the second relative rotation angle $\theta_{RC}$ of the rotor 1 based on the second output signal V2 and computes the second absolute rotation angle (corresponding to mechanical angle×number of magnetic pole pairs in the present example) $\theta_{AC}$ of the rotor 1 based on the obtained second relative rotation angle $\theta_{RC}$, etc. The rotation angle computation device 20 then computes the final absolute rotation angle $\theta_A$ of the rotor 1 based on the obtained first absolute rotation angle $\theta_{AS}$ and second absolute rotation angle $\theta_{AC}$ and computes the electrical angle $\theta_E$ of the rotor of the brushless motor based on the obtained absolute rotation angle $\theta_A$. The rotation angle computation device 20 is made up of a microcomputer, for example, and includes a CPU (central processing unit) and a memory (ROM, RAM, rewritable nonvolatile memory, etc.).

The electrical angle $\theta_E$ computed by the rotation angle computation device 20 is provided to a motor controller 30. The motor controller 30 controls the brushless motor 10 based on the electrical angle $\theta_E$ provided from the rotation angle computation device 20 and a predetermined command value.

Operation of the rotation angle computation device 20 shall now be described. Amplitude compensation tables are stored according to the magnetic sensors 21 and 22 in the rewritable nonvolatile memory of the rotation angle computation device 20.

FIG. 5A shows an example of contents of the amplitude compensation table (may hereinafter be referred to as the "first table") for the first magnetic sensor 21. In accordance with each of magnetic pole numbers 0 to 9 of the respective magnetic poles M0 to M9, a peak value (maximum value or minimum value) of the first output signal V1 that corresponds to the magnetic pole, an angular width [deg] of the magnetic pole, and a compensation gain G1 are stored in the first table. As described with Table 1, the value of the angular width is obtained by multiplying the mechanical angle corresponding to the angular width by the number of magnetic pole pairs ("5" in the present preferred embodiment). The compensation gain G1 is a gain for compensating variation according to magnetic pole of the amplitude of the first output signal V1.

The amplitude compensation gain G1 for any magnetic pole is determined based on the following formula (5) using the peak value (maximum value or minimum value) of the first output signal V1 that corresponds to the magnetic pole and a reference amplitude. The reference amplitude is, for example, a value corresponding to a peak value (absolute value) of the first output signal V1 that corresponds to a magnetic pole for which the angular width (mechanical angle×number of magnetic pole pairs) is 180°. The reference amplitude is set in advance and is "500" in the present example.

$$G1 = \text{Reference amplitude}/|\text{Peak value}| \quad (5)$$

FIG. 5B shows an example of contents of the amplitude compensation table (may hereinafter referred to as the "second table") for the second magnetic sensor 22. In accordance with each of magnetic pole numbers 0 to 9 of the respective magnetic poles M0 to M9, the peak value (maximum value or minimum value) of the second output signal V2 that corresponds to the magnetic pole, the angular width [deg] of the magnetic pole, and a compensation gain G2 are stored in the second table. The compensation gain G2 is a gain for compensating variation according to magnetic pole of the amplitude of the second output signal V2. Although in FIG. 5B, the peak values of the second output signal V2 with respect to the respective magnetic poles are of the same values as the peak values of the first output signal V1 with respect to the corresponding magnetic poles, the values may actually differ from each other.

The compensation gain G2 for any magnetic pole is determined based on the following formula (6) using the peak value (maximum value or minimum value) of the second output signal V2 that corresponds to the magnetic pole and a reference amplitude. The reference amplitude is, for example, a value corresponding to a peak value (absolute value) of the second output signal V2 that corresponds to a magnetic pole for which the angular width is 180°. The reference amplitude is set in advance and is "500" in the present example.

$$G2 = \text{Reference amplitude}/|\text{peak value}| \quad (6)$$

The storing of the peak values and the compensation gains in the amplitude compensation tables may be performed before shipment of the brushless motor 10 or may be performed by detecting peak values during motor control after shipment of the brushless motor 10. The peak values and the compensation gains stored in the amplitude compensation tables may be determined from data of a single cycle or may be determined from average values of data of a plurality of cycles.

Also, two types of magnetic pole identification tables (which may hereinafter be referred to as the "third table" and the "fourth table") are stored in the rewritable nonvolatile memory in the rotation angle computation device 20. In the third table, data indicating the pole number of a magnetic pole sensed by the second magnetic sensor 22 when a peak value with respect to a magnetic pole is detected by the first magnetic sensor 21 is stored according to each magnetic pole (each magnetic pole number) for which the peak value is detected by the first magnetic sensor 21. In the fourth table, data indicating the pole number of a magnetic pole sensed by the first magnetic sensor 21 when a peak value with respect to a magnetic pole is detected by the second magnetic sensor 22 is stored according to each magnetic pole (each magnetic pole number) for which the peak value is detected by the second magnetic sensor 22. The third table and the fourth table are prepared based on the positions and the angular interval of the two magnetic sensors 21 and 22 and the arrangement of the rotor 1.

Upon detecting a peak value from the output signal V1 or V2 of the first or second magnetic sensor 21 or 22, the rotation angle computation device 20 identifies, based on the amplitude compensation table (the first table or the second table) corresponding to the magnetic sensor with which the peak value is detected, the pole number of the magnetic pole sensed by the magnetic sensor. The peak value of a sensor signal changes in accordance with temperature characteristics of the magnet (the peak value decreases as a temperature of the magnet increases) and thus in the above process, the table value may be compensated by multiplying the peak value of the amplitude compensation table by a temperature coefficient (a coefficient that decreases as the temperature increases) of the magnet and the pole number of the magnetic pole may be identified based on the detected peak value and the compensated table value.

In the present preferred embodiment, the peak value corresponding to the magnetic pole M5 and the peak value corresponding to the magnetic pole M9 are the same and thus when the peak value corresponding to the magnetic pole M5 or the magnetic pole M9 is detected by one of either magnetic sensor, the rotation angle computation device 20 cannot identify the pole number of the magnetic pole sensed by the magnetic sensor. The rotation angle computation device 20 thus identifies the pole number of the magnetic pole sensed by either magnetic sensor when a peak value corresponding to a magnetic pole other than magnetic pole M5 or M9 is detected by the magnetic sensor after the start of the rotation angle computation process.

Based on the identified pole number and the third or fourth table (magnetic pole identification table), the rotation angle computation device 20 identifies the pole number of the magnetic pole sensed by the other magnetic sensor. For example, when the pole number of the magnetic pole sensed by the first magnetic sensor 21 is identified based on the first table, then, based on the identified pole number and the third table, the pole number of the magnetic pole sensed by the second magnetic sensor 22 is identified. On the other hand, when the pole number of the magnetic pole sensed by the second magnetic sensor 22 is identified based on the second table, then, based on the identified pole number and the fourth table, the pole number of the magnetic pole sensed by the first magnetic sensor 21 is identified.

The pole numbers of the magnetic poles sensed by the respective magnetic sensors 21 and 22 are thereby identified, and the rotation angle computation device 20 thus amplitude-compensates the output signals V1 and V2 of the respective magnetic sensors 21 and 22 using the compensation gains G1 and G2 corresponding to the magnetic poles being sensed respectively.

The rotation angle computation device 20 then computes the first relative rotation angle $\theta_{RS}$ of the rotor 1 based on the value of the amplitude-compensated first output signal V1' and the polarity of the amplitude-compensated second output signal V2' (see FIG. 4A). The first absolute rotation angle $\theta_{AS}$ is then computed based on the obtained first relative rotation angle $\theta_{RS}$, the pole number of the magnetic pole identified as that being sensed by the first magnetic sensor 21, and the contents of the amplitude compensation table. Also, the rotation angle computation device 20 computes the second relative rotation angle $\theta_{RC}$ of the rotor 1 based on the value of the amplitude-compensated second output signal V2' and the polarity of the amplitude-compensated first output signal V1' (see FIG. 4B). The second absolute rotation angle $\theta_{AC}$ is then computed based on the obtained second relative rotation angle $\theta_{RC}$, the pole number of the magnetic pole identified as that being sensed by the first magnetic sensor 21, and the contents of the amplitude compensation table.

Also, the rotation angle computation device 20 computes the final absolute rotation angle $\theta_A$ based on the obtained first absolute rotation angle $\theta_{AS}$ and second absolute rotation angle $\theta_{AC}$ and computes the electrical angle $\theta_E$ of the brushless motor 10 based on the obtained final absolute rotation angle $\theta_A$.

Thereafter, each time a peak value is detected from the output signal V1 and V2 of the first or second magnetic sensor 21 or 22, the rotation angle computation device 20 updates the pole number already identified for the one magnetic sensor for which the peak value is detected and compensates the output signal of the magnetic sensor using the compensation gain corresponding to the updated pole number. The rotation angle computation device 20 then computes the electrical angle $\theta_E$ of the brushless motor 10 in the same manner as described above.

FIG. 6 is a flowchart of a procedure of a rotation angle computation process performed by the rotation angle computation device 20.

When the motor controller 30 is started up, the rotation angle computation device 20 reads the output signals (sensor values) V1 and V2 of the respective magnetic sensors 21 and 22 (step S1). Sensor values of a plurality of times of reading, from the sensor values read a predetermined number of times previously up to the most recently read sensor values, are stored in the memory (for example, RAM) of the rotation angle computation device 20. Based on the sensor values stored in the memory, the rotation angle computation device 20 judges, for each of the sensor values V1 and V2, whether or not a peak value has been detected (step S2). The judgment process of step S2 may be referred to hereinafter as the peak value detection process. Specifically, the rotation angle computation device 20 judges that a peak value (maximum value) is detected and identifies the maximum value when a sensor value changes from an increasing trend to a decreasing trend. Also, the rotation angle computation device 20 judges that a peak value (minimum value) is detected and identifies the minimum value when a sensor value changes from a decreasing trend to an increasing trend.

If a peak value is not detected in step S2 (step S2: NO), step S6 is entered. On the other hand, if a peak value is detected in step S2 (step S2: YES), the rotation angle computation device 20 judges whether or not the magnetic poles sensed by the respective magnetic sensors 21 and 22 have already been identified by a pole number identification process of step S4, to be described below, after the startup of the controller (step S3).

If the pole number identification process has not been performed after controller startup or the pole number identification process has been performed but the magnetic poles sensed by the respective magnetic sensors 21 and 22 could not be identified after controller startup (step S3: NO), the rotation angle computation device 20 performs the pole number identification process (step S4). That is, the rotation angle computation device 20 performs the process for identifying the magnetic poles respectively sensed by the respective magnetic sensors 21 and 22.

Specifically, based on the peak value (maximum value or minimum value) detected by the peak value detection process of step S2 and the contents of the amplitude compensation table (the first or the second table) corresponding to the magnetic sensor that outputted the peak value, the rotation angle computation device 20 first identifies the magnetic pole sensed by the magnetic sensor. That is, the rotation angle computation device 20 identifies the pole number corresponding to the peak value, which, among the plurality of peak values stored in the amplitude compensation table, is closest to the peak value detected by the peak value detection process, as the pole number of the magnetic pole sensed by the magnetic sensor.

However, in the case where the pole number corresponding to the peak value closest to the peak value detected by the peak value detection process is the pole number corresponding to the magnetic pole M5 or the magnetic pole M9, the rotation angle computation device 20 does not identify the magnetic pole sensed by the magnetic sensor.

In the case where the pole number of the magnetic pole sensed by the magnetic sensor could be identified, the rotation angle computation device 20 identifies, based on the pole number of the magnetic pole sensed by the magnetic sensor and the third table or the fourth table (magnetic pole identification table), the magnetic pole sensed by the other magnetic sensor. The magnetic poles sensed by the respective magnetic sensors 21 and 22 are thereby identified. When the process of step S4 is completed, step S6 is entered.

If in step S3, it is judged that pole numbers of the magnetic poles sensed by the respective sensors 21 and 22 have been identified by the pole number identification process of step S4 performed after controller startup (step S3: YES), the rotation angle computation device 20 performs a pole number update process (step S5). Specifically, the rotation angle computation device 20 updates, based on the direction of rotation of the rotor 1, the pole number already identified for the magnetic sensor for which the peak value was detected by the peak value detection process of step S2. More specifically, the rotation angle computation device 20 changes the pole number already identified for the magnetic sensor to a pole number that is greater by just 1 or a pole number that is less by just 1 in accordance with the direction of rotation of the rotor 1.

If the direction of rotation of the rotor 1 is the positive direction (direction indicated by the arrow in FIG. 2), the already identified pole number is updated to a pole number that is greater by just 1, and if the direction of rotation of the rotor 1 is the opposite direction, the already identified pole number is updated to a pole number that is less by just 1. However, for the pole number "0," the pole number that is less by just 1 is "9." Also, for the pole number "9," the pole number that is greater by just 1 is "0." When the process of step S5 is completed, step S6 is entered. The direction of rotation of the rotor 1 may be judged, for example, based on phases of the output signals V1 and V2 of the respective magnetic sensors 21 and 22. Specifically, if the second output signal V2 is leading in phase with respect to the first output signal V1 (if the peak value for the same magnetic pole is detected from V2 and then detected from V1) it is judged that the direction of rotation of the rotor 1 is the positive direction. On the other hand, if the first output signal V1 is leading in phase with respect to the second output signal V2 (if the peak value for the same magnetic pole is detected from V1 and then detected from V2), it is judged that the direction of rotation of the rotor 1 is the opposite direction.

In step S6, the rotation angle computation device 20 performs amplitude compensation on the sensor values V1 and V2 read in step S1. Specifically, the rotation angle computation device 20 reads, from the first table and the second table, the amplitude compensation gains G1 and G2 corresponding to the pole numbers currently identified for the respective magnetic sensors 21 and 22. The rotation angle computation device 20 then uses the gains G1 and G2 read from the first table and the second table to respectively compensate the sensor values V1 and V2 read in step S1. If V1' and V2' are the compensated sensor values, V1' and V2' are respectively expressed by the following formulae (7) and (8).

$$V1' = V1 \times G1 \tag{7}$$

$$V2' = V2 \times G2 \tag{8}$$

However, from the startup of the controller until the detection of a peak value, the magnetic poles sensed by the respective magnetic sensors 21 and 22 are not identified and thus step S7 is entered without the compensation of the sensor values V1 and V2 being performed in step S6. Step S7 is also entered without the compensation of the sensor values V1 and V2 being performed in step S6 if in a case where step S6 is entered from step S4, the pole numbers of the magnetic poles sensed by the two magnetic sensors 21 and 22 are not identified in the pole number identification process of step S4.

When the amplitude compensation of step S6 has been performed, the rotation angle computation device 20 computes the first relative rotation angle $\theta_{RS}$ of the rotor 1 using the amplitude-compensated first output signal V1' and the polarity of the amplitude-compensated second output signal V2' and based on formula (3) (step S7).

The rotation angle computation device 20 then computes the first absolute rotation angle $\theta_{AS}$ of the rotor 1 based on the first relative rotation angle $\theta_{RS}$ of the rotor 1 computed in step S7, the pole number of the magnetic pole sensed by the first magnetic sensor 21, and the contents of the amplitude compensation table (step S8). The pole number from 0 to 9 of the magnetic pole M0 to magnetic pole M9 shall be expressed by n. The angular width of each of the magnetic pole M0 to the magnetic pole M9 shall be expressed by $W_n$ (n=0, ..., 9). Here, as described with Table 1, the angular width is a value obtained by multiplying the mechanical angle corresponding to the angular width by the number of magnetic pole pairs ("5" in the present preferred embodiment). The pole number of the magnetic pole sensed by the first magnetic sensor 21 shall be expressed by m. The rotation angle computation device 20 computes the first absolute rotation angle $\theta_{AS}$ based on the following formula (9), (10), or (11).

In a case where m is 0;

$$\theta_{AS} = \theta_{RS} \times (Wm/180) \tag{9}$$

In a case where m is 2, 4, 6, or 8;

$$\theta_{AS} = \{\theta_{RS} \times (Wm/180)\} + \sum_{n=0}^{m-1} Wn \tag{10}$$

In a case where m is 1, 3, 5, 7, or 9;

$$\theta_{AS} = \{(\theta_{RS} - 180) \times (Wm/180)\} + \sum_{n=0}^{m-1} Wn \tag{11}$$

In the case where m is 0, 2, 4, 6, or 8, that is, in the case where the amplitude-compensated first output signal V1' is positive, the first relative rotation angle $\theta_{RS}$ is an angle within the range of 0° to 180°. On the other hand, in the case where m is 1, 3, 5, 7, or 9, that is, in the case where the amplitude-compensated first output signal V1' is negative, the first relative rotation angle $\theta_{RS}$ is an angle within the range of 180° to 360°.

The term $\{\theta_{RS} \times (W_m/180)\}$ at the right hand side of each of formulae (9) and (10) is a term for converting (phase-compensating) the first relative rotation angle $\theta_{RS}$ (0° to 180°) to a relative rotation angle (0° to $W_m$) that is in accordance with the angular width $W_m$ (m=0, 2, 4, 6, 8) of the magnetic pole sensed by the first magnetic sensor 21. The term $\{(\theta_{RS} - 180) \times (W_m/180)\}$ at the right hand side of formula (11) is a term for converting (phase-compensating) the first relative rotation angle $\theta_{RS}$ (180° to 360°) to a relative rotation angle (0° to $W_m$) that is in accordance with the angular width $W_m$ (m=1, 3, 5, 7, 9) of the magnetic pole sensed by the first magnetic sensor 21.

For example, in a case where the pole number m of the magnetic pole sensed by the first magnetic sensor 21 is 0, that is, in the case where the magnetic pole sensed by the first magnetic sensor 21 is M0, the first absolute rotation angle $\theta_{AS}$ is, from formula (9), $\theta_{AS} = \{\theta_{RS} \times (W_0/180)\}$. $W_0 = 170$ (see FIG. 5A) and thus the first absolute rotation angle $\theta_{AS}$ is $\theta_{AS} = \{\theta_{RS} \times (170/180)\}$.

Also, in a case where the pole number m of the magnetic pole sensed by the first magnetic sensor 21 is 1, that is, in the case where the magnetic pole sensed by the first magnetic sensor 21 is M1, the first absolute rotation angle $\theta_{AS}$ is, from formula (11), $\theta_{AS} = [\{(\theta_{RS} - 180) \times (W_1/180)\} + W_0]$. $W_0 = 170$, $W_1 = 165$ (see FIG. 5A), and thus the first absolute rotation angle $\theta_{AS}$ is $\theta_{AS} = [\{(\theta_{RS} - 180) \times (165/180)\} + 170]$.

Also, in a case where the pole number m of the magnetic pole sensed by the first magnetic sensor 21 is 2, that is, in the case where the magnetic pole sensed by the first magnetic sensor 21 is M2, the first absolute rotation angle $\theta_{AS}$ is, from formula (10), $\theta_{AS} = [\{\theta_{RS} \times (W_2/180)\} + (W_0 + W_1)]$. $W_0 = 170$, $W_1 = 165$, $W_2 = 160$ (see FIG. 5A), and thus the first absolute rotation angle $\theta_{AS}$ is $\theta_{AS} = [\{\theta_{RS} \times (160/180)\} + 335]$.

When the process of step S8 has been performed, the rotation angle computation device 20 computes the second relative rotation angle $\theta_{RC}$ of the rotor 1 using the amplitude-compensated second output signal V2' and the polarity of the amplitude-compensated first output signal V1' and based on formula (4) (step S9).

The rotation angle computation device 20 then computes the second absolute rotation angle $\theta_{AC}$ of the rotor 1 based on the second relative rotation angle $\theta_{RC}$ of the rotor 1 computed in step S9, the pole number of the magnetic pole sensed by the first magnetic sensor 21, and the contents of the amplitude compensation table (step S10). The pole number from 0 to 9 of the magnetic pole M0 to magnetic pole M9 shall be expressed by n. The angular width of each of the magnetic pole M0 to the magnetic M9 shall be expressed by $W_n$ (n=0, 1, ..., 9). The pole number of the magnetic pole sensed by the first magnetic sensor 21 shall be expressed by m. The rotation angle computation device 20 computes the second absolute rotation angle $\theta_{AC}$ based on the following formula (12), (13), or (14).

In a case where m is 0;

$$\theta_{AC} = \theta_{RC} \times (Wm/180) \quad (12)$$

In a case where m is 2, 4, 6, or 8;

$$\theta_{AC} = \{\theta_{RC} \times (Wm/180)\} + \sum_{n=0}^{m-1} Wn \quad (13)$$

In a case where m is 1, 3, 5, 7, or 9;

$$\theta_{AC} = \{(\theta_{RC} - 180) \times (Wm/180)\} + \sum_{n=0}^{m-1} Wn \quad (14)$$

The term $\{\theta_{RC} \times (W_m/180)\}$ at the right hand side of each of formulae (12) and (13) is a term for converting (phase-compensating) the second relative rotation angle $\theta_{RC}$ (0° to 180°) to a relative rotation angle (0° to $W_m$) that is in accordance with the angular width $W_m$ (m=0, 2, 4, 6, 8) of the magnetic pole sensed by the first magnetic sensor 21. The term $\{(\theta_{RC}-180) \times (W_m/180)\}$ at the right hand side of formula (14) is a term for converting (phase-compensating) the second relative rotation angle $\theta_{RC}$ (180° to 360°) to a relative rotation angle (0° to $W_m$) that is in accordance with the angular width $W_m$ (m=1, 3, 5, 7, 9) of the magnetic pole sensed by the first magnetic sensor 21.

When the first absolute rotation angle $\theta_{AS}$ and the second absolute rotation angle $\theta_{AC}$ have been computed as described above, the rotation angle computation device 20 computes the final absolute rotation angle $\theta_A$ based on the absolute rotation angles $\theta_{AS}$ and $\theta_{AC}$ (step S11). Specifically, the rotation angle computation device 20 computes the final absolute rotation angle $\theta_A$ based on the following formula (15) in which K (K>0) is a predetermined threshold.

When |V1'|≥K;

$\theta_A = \theta_{AC}$, when |V2'|≥K;

$\theta_A = \theta_{AS}$, and otherwise $$\theta_A = (\theta_{AS} + \theta_{AC})/2. \quad (15)$$

Figure 8:
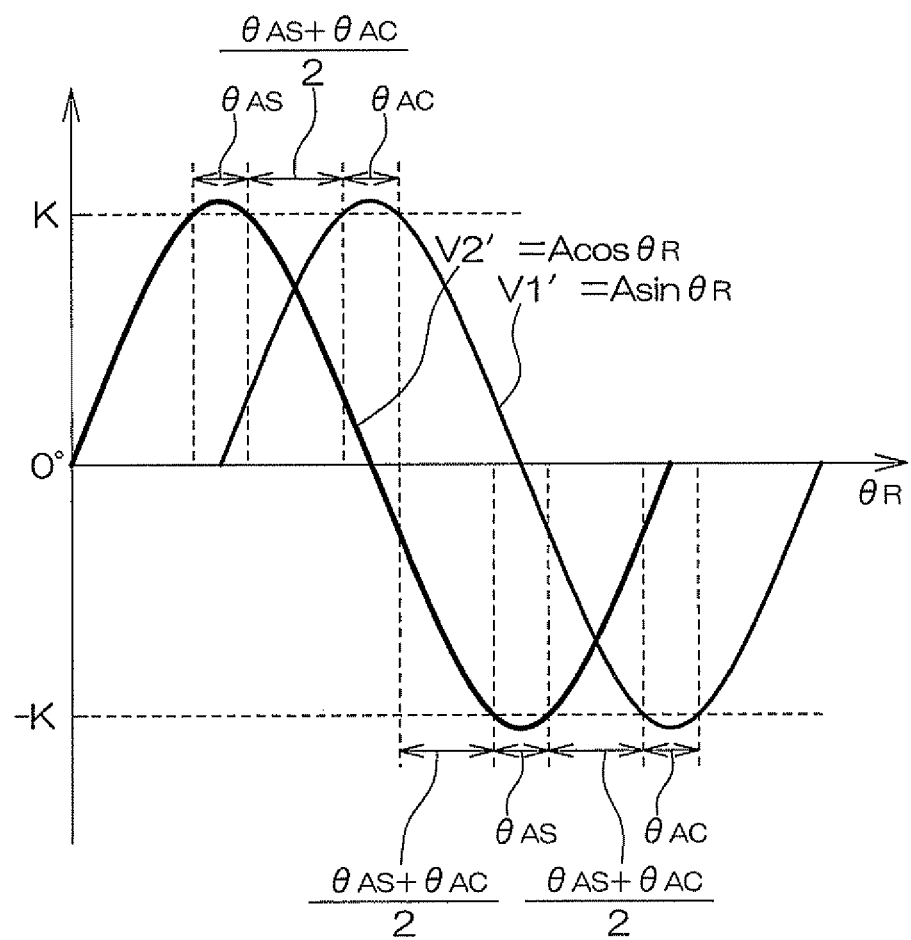
FIG. 8 is an explanatory diagram for describing a method for computing a final absolute rotation angle from a first absolute rotation angle and a second absolute rotation angle.

Referring to FIG. 8, in a case where the absolute value |V1'| of the amplitude-corrected first output signal V1' (=A·sin $\theta_R$) is no less than the threshold K (|V1'|≥K), the rotation angle computation device 20 determines the second absolute rotation angle $\theta_{AC}$ as the final absolute rotation angle $\theta_A$. The reason for this shall now be described. As described using FIG. 4A, in the case of determining the relative rotation angle $\theta_R$ (=sin$^{-1}$(V1'/A)) from the amplitude-corrected first output signal V1' (=A·sin $\theta_R$), it is unknown in which one of the two regions (P1 or P2, Q1 or Q2) the actual relative rotation angle belongs. The region among the two regions in which the actual relative rotation angle belongs is thus judged based on the polarity of the amplitude-corrected second output signal V2' (=A·cos $\theta_R$). When the peak position (extremum) of the amplitude-corrected first output signal V1' and the zero cross position of the amplitude-corrected second output signal V2' are shifted, an error may occur in the region judgment near the extremum (peak value) of the output signal V1'. Thus, when the amplitude-corrected first output signal V1' is near the peak value, the second absolute rotation angle $\theta_{AC}$ computed based on the amplitude-corrected second output signal V2' is determined as the final absolute rotation angle $\theta_A$.

By the same reason, in a case where the absolute value |V2'| of the amplitude-corrected second output signal V2' (=A·cos $\theta_R$) is no less than the threshold K (|V2'|≥K), the rotation angle computation device 20 determines the first absolute rotation angle $\theta_{AS}$ as the final absolute rotation angle $\theta_A$. When |V1'|<K and |V2'|<K, the rotation angle computation device 20 determines an average value $\{(\theta_{AS}+\theta_{AC})/2\}$ of the first absolute rotation angle $\theta_{AS}$ and the second absolute rotation angle $\theta_{AC}$ as the final absolute rotation angle $\theta_A$.

In a case where |V1'|<K and |V2'|<K, a value determined by adding the first absolute rotation angle $\theta_{AS}$ and the second absolute rotation angle $\theta_{AC}$ together upon applying weights (gain, 1−gain) respectively may be determined as the final absolute rotation angle $\theta_A$ as shown in the following formula (16).

$\theta_A = \theta_{AS} \times \text{gain} + \theta_{AC} \times (1-\text{gain})$ When |V1'|≥|V2'|;

gain=(K−|V1'|)/(K−|V2'|)/2.

When |V1'|<|V2'|;

$$\text{gain}=1-\{(K-|V2'|)/(K-|V1'|)/2\}. \quad (16)$$

Also, when |V1'|<K and |V2'|<K, one of either of the first absolute rotation angle $\theta_{AS}$ and the second absolute rotation angle $\theta_{AC}$ may be determined as the final absolute rotation angle $\theta_A$.

When the final absolute rotation angle $\theta_A$ has thus been computed, the rotation angle computation device 20 computes the electrical angle $\theta_E$ (step S12). Specifically, if j is the number (1 to 5) of the magnetic pole pair (M0, M1), (M2, M3), (M4, M5), (M6, M7), or (M8, M9) sensed by the first magnetic sensor 21, the rotation angle computation device 20 computes the electrical angle $\theta_E$ based on the following formula (17) and provides it to the motor controller 30.

$$\theta_E = \theta_A - \{360 \times (j-1)\} \quad (17)$$

Thereafter, the rotation angle computation device 20 judges whether or not motor control has been completed (step S13). If the motor control has not been completed (step S13: NO), a return to step S1 is performed. If the motor control has been completed (step S13: YES), the rotation angle computation device 20 performs a control completion process (step S14).

Figure 7:
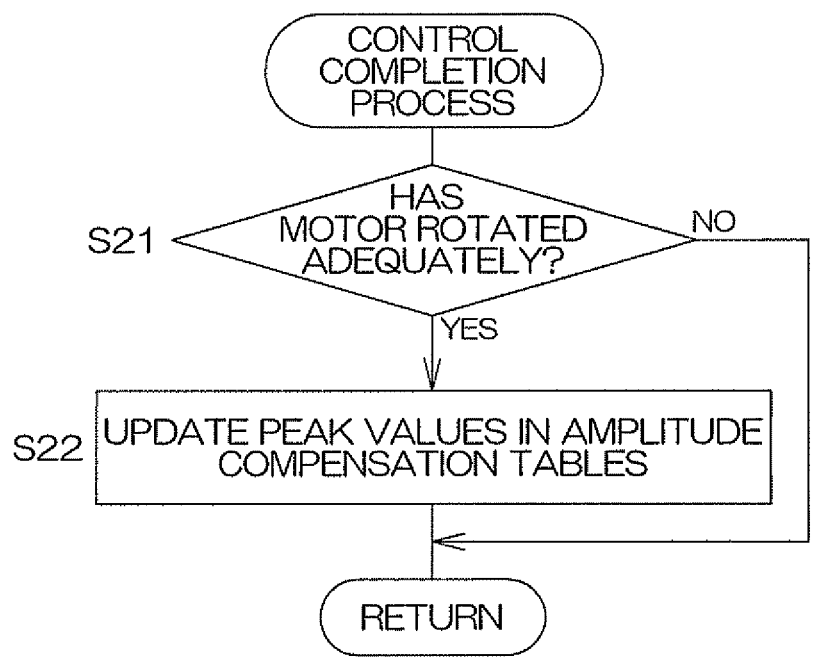
FIG. 7 is a flowchart of an example of a control completion process.

FIG. 7 is a flowchart of an example of the control completion process.

In the control completion process, the rotation angle computation device 20 judges whether or not the brushless motor 10 has rotated adequately during the present motor control period (step S21). Specifically, the rotation angle computation device 20 judges whether or not the number of rotations of the motor 10 during the present motor control period is no less than a predetermined number of rotations. If it is judged that the brushless motor 10 has rotated adequately (step S21: YES), the peak values corresponding to the respective pole numbers in the amplitude compensation tables (the first table and the second table) are updated by the most recently detected peak values as the peak values corresponding to the pole numbers (step S22). The control completion process is then completed.

Figure 9:
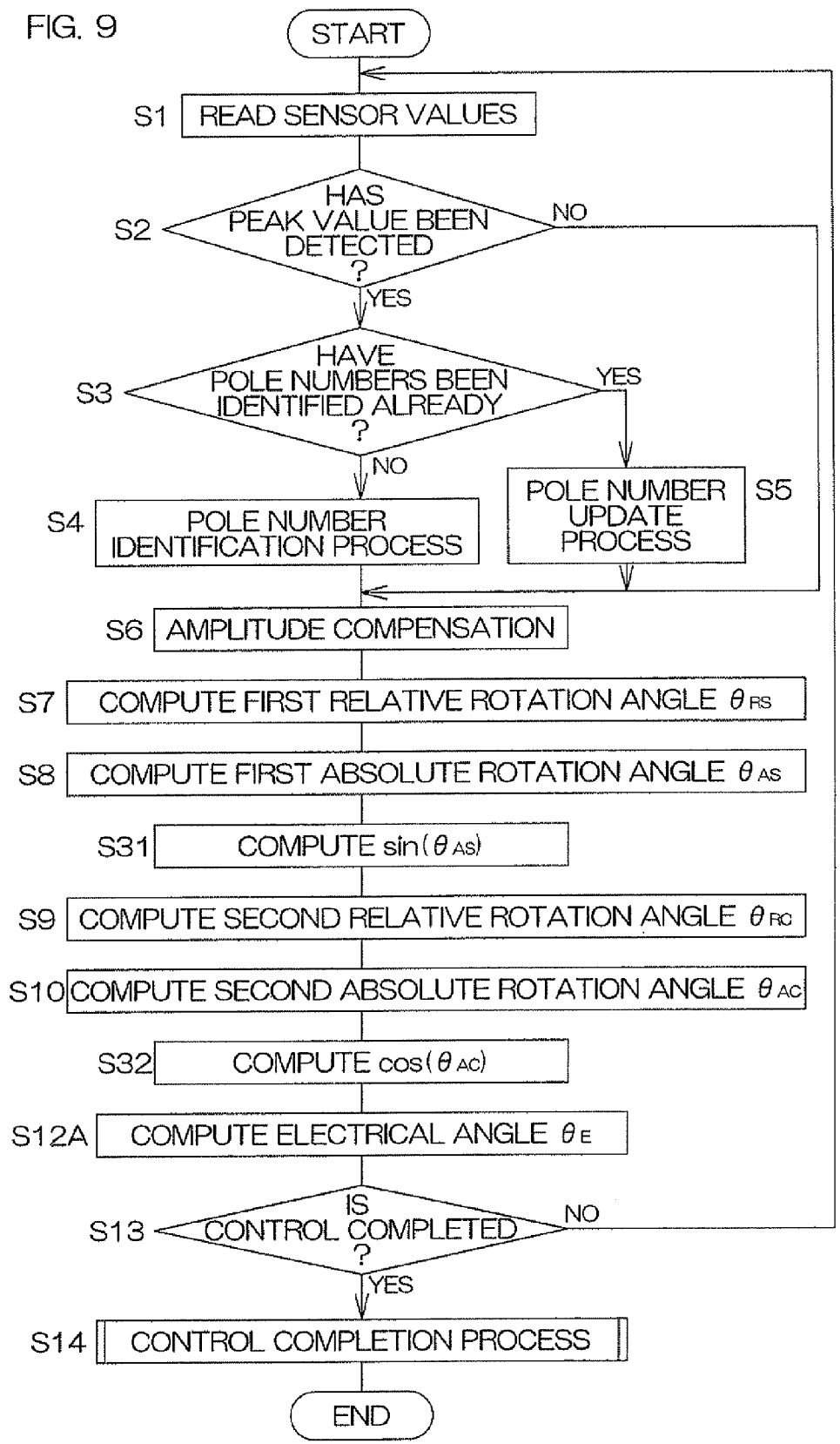
FIG. 9 is a flowchart of another example of a rotation angle computation process performed by the rotation angle detection device.
Figure 10:
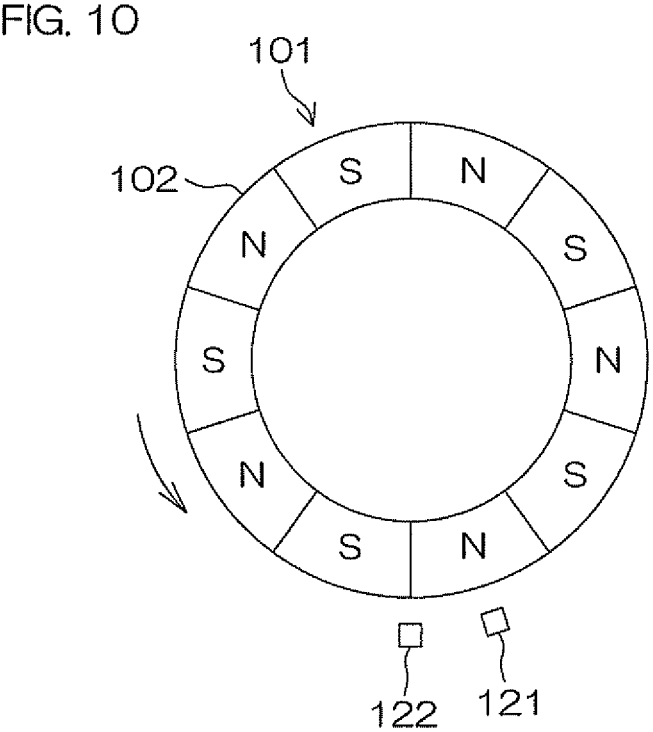
FIG. 10 is a schematic view for describing a rotation angle detection method according to a conventional rotation angle detection device.
Figure 11:
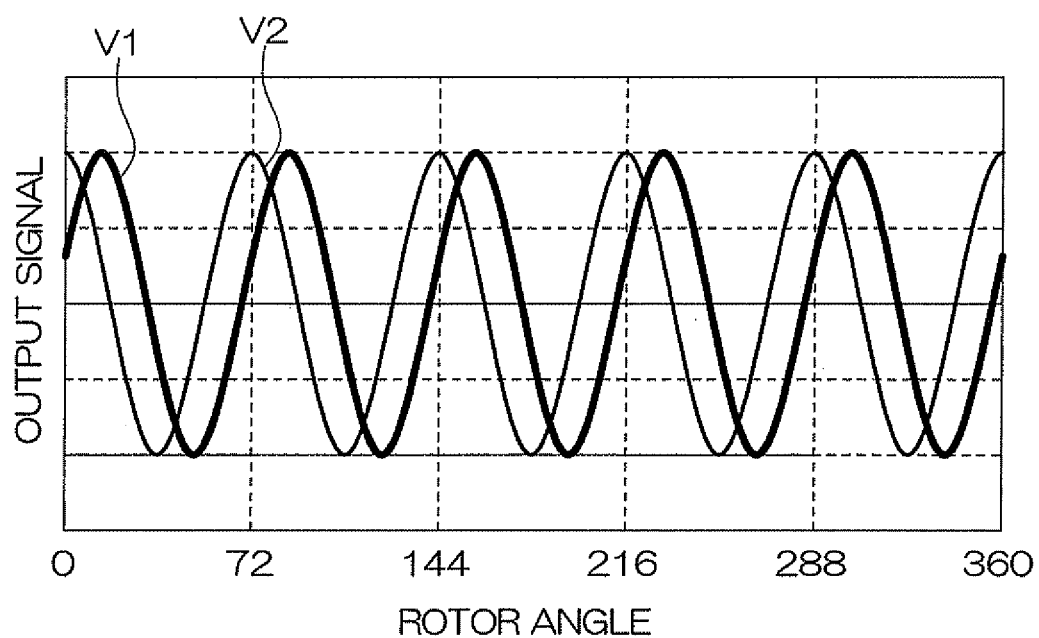
FIG. 11 is a schematic view of an output signal waveform of a first magnetic sensor and an output signal waveform of a second magnetic sensor.

FIG. 9 is a flowchart of another example of a rotation angle computation process performed by the rotation angle detection device 20. With the respective steps of FIG. 9, a step in which the same process as that of a step in FIG. 6 is performed is provided with the same step number as in FIG. 6.

When the first absolute rotation angle $\theta_{AS}$ has been computed in step S8, the rotation angle computation device 20 computes $\sin(\theta_{AS})$ (step S31). $\sin(\theta_{AS})$ is a value that is in accordance with the signal value $A \cdot \sin(\theta_{AS})$ of the signal V1' (=$A \cdot \sin \theta_R$) corresponding to the first absolute rotation angle $\theta_{AS}$. Step S9 is then entered. In step S9, the second relative rotation angle $\theta_{RC}$ is computed, and in step S10, the second absolute rotation angle $\theta_{AC}$ is computed. When the second absolute rotation angle $\theta_{AC}$ has been computed in step S10, the rotation angle computation device 20 computes $\cos(\theta_{AC})$ (step S32). $\cos(\theta_{AC})$ is a value that is in accordance with the signal value $A \cdot \cos(\theta_{AC})$ of the signal V2' (=$A \cdot \cos \theta_R$) corresponding to the second absolute rotation angle $\theta_{AC}$.

The rotation angle computation device 20 then computes the electrical angle $\theta_E$ based on the $\sin(\theta_{AC})$ computed in step S31 and the $\cos(\theta_{AC})$ computed in step S32 (step S12A). Specifically, the rotation angle computation device 20 computes the electrical angle $\theta_E$ of the brushless motor based on the following formula (18).

$$\theta_E = \tan^{-1}\{\sin(\theta_{AS})/\cos(\theta_{AC})\} \quad (18)$$

Thereafter, the rotation angle computation device 20 enters step S13.

As described above, when the amplitude-corrected first output signal V1' is near the peak value, an error may occur in the first relative rotation angle $\theta_{RS}$. Likewise, when the amplitude-corrected second output signal V2' is near the peak value, an error may occur in the second relative rotation angle $\theta_{RC}$. The electrical angle $\theta_E$ of the brushless motor may thus be computed based on the second absolute rotation angle $\theta_{AC}$ when the amplitude-corrected first output signal V1' is near the peak value, and the electrical angle $\theta_E$ of the brushless motor may be computed based on the first absolute rotation angle $\theta_{AS}$ when the amplitude-corrected second output signal V2' is near the peak value.

In a case of computing the electrical angle $\theta_E$ based on the second absolute rotation angle $\theta_{AC}$, the electrical angle $\theta_E$ may be determined by substituting the second absolute rotation angle $\theta_{AC}$ as the absolute rotation angle $\theta_A$ at the right hand side of formula (17). Also, in a case of computing the electrical angle $\theta_E$ based on the first absolute rotation angle $\theta_{AS}$, the electrical angle $\theta_E$ may be determined by substituting the first absolute rotation angle $\theta_{AS}$ as the absolute rotation angle $\theta_A$ at the right hand side of formula (17).

As shown in formula (9), (10), or (11), in the present preferred embodiment, the first absolute rotation angle $\theta_{AS}$ of the detection rotor 1 is computed based on the first relative rotation angle $\theta_{RS}$, the angular widths $W_0$ to $W_9$ of the respective magnetic poles measured in advance, and the pole number m of the magnetic pole sensed by the first magnetic sensor 21. An accurate absolute rotation angle $\theta_{AS}$ can thereby be computed from the first relative rotation angle $\theta_{RS}$ even when there is variation in the angular widths of the plurality of magnetic poles M0 to M9 provided in the detection rotor 1. Also, as shown in formula (12), (13), or (14), the second absolute rotation angle $\theta_{AC}$ of the detection rotor 1 is computed based on the second relative rotation angle $\theta_{RC}$, the angular widths $W_0$ to $W_9$ of the respective magnetic poles measured in advance, and the pole number m of the magnetic pole sensed by the first magnetic sensor 21. An accurate absolute rotation angle $\theta_{AC}$ can thereby be computed from the second relative rotation angle $\theta_{RC}$ even when there is variation in the angular widths of the plurality of magnetic poles M0 to M9 provided in the detection rotor 1. Also, as shown in formulae (15) to (17) or formula (18), the electrical angle $\theta_E$ of the brushless motor is computed based on the first absolute rotation angle $\theta_{AS}$ and the second absolute rotation angle $\theta_{AC}$. The electrical angle $\theta_E$ of the brushless motor can thereby detected with high precision even when there is variation in the angular widths of the respective magnetic poles M0 to M9.

The present invention may be applied to cases of detecting a rotation angle of a rotating body other than a rotor of a brushless motor.

While preferred embodiments of the present invention have been described in detail above, these are merely specific examples for clarifying the technical contents of the present invention, the present invention should not be interpreted as being limited to the specific examples, and the scope of the present invention is to be limited solely by the attached claims.

The present application corresponds to Japanese Patent Application No. 2010-95080 filed in the Japan Patent Office on Apr. 16, 2010 and the entire disclosure of the present application is incorporated herein by reference.

REFERENCE SYMBOLS LIST

1 . . . Rotor
21, 22 . . . Magnetic sensor
10 . . . Brushless motor
M0-M9 . . . Magnetic pole
The invention claimed is:

1. A rotation angle detection device comprising: a detection rotor rotating in accordance with rotation of a rotating body and provided with a plurality of magnetic poles; a first magnetic sensor outputting, in accordance with the rotation of the detection rotor, a first output signal that is a sinusoidal signal serving as a reference; and a second magnetic sensor outputting, in accordance with the rotation of the detection rotor, a second output signal that is a sinusoidal signal having a predetermined phase difference with respect to the first output signal; and detecting a rotation angle of the rotating body based on the first output signal and the second output signal of the first magnetic sensor and the second magnetic sensor, the rotation angle detection device further comprising:
a memory configured to store angular widths of the plurality of magnetic poles measured in advance; and
one or more processors programmed to:
set, for each magnetic pole pair of the plurality of magnetic poles, a division corresponding to an angular width of the magnetic pole pair,
identify, based on the first output signal, a magnetic pole sensed by the first magnetic sensor,
compute, based on the first output signal, a first rotation angle that is a rotation angle within the division,
compute, based on the second output signal, a second rotation angle that is a rotation angle within the division,
compute a first absolute rotation angle of the detection rotor based on the computed first rotation angle, the angular widths of the plurality of magnetic poles stored in the memory, and the identified magnetic pole,
compute a second absolute rotation angle of the detection rotor based on the computed second rotation angle, the angular widths of the plurality of magnetic poles stored in the memory, and the identified magnetic pole, and compute a rotation angle of the rotating body based on the computed first absolute rotation angle and the computed second absolute rotation angle, wherein the phase difference between the first output signal and the second output signal is 90°, the first rotation angle is computed based on the first output signal and a polarity of the second output signal, the second rotation angle is computed based on the second output signal and a polarity of the first output signal, and the one or more processors are further programmed to:

compute the rotation angle of the rotating body based on the computed second absolute rotation angle when an absolute value of the first output signal is greater than or equal to a predetermined value, compute the rotation angle of the rotating body based on the computed first absolute rotation angle when an absolute value of the second output signal is greater than or equal to the predetermined value, and compute the rotation angle of the rotating body based on one of either or both of the computed first absolute rotation angle and the computed second absolute rotation angle when both the absolute value of the first output signal and the absolute value of the second output signal are less than the predetermined value.

2. The rotation angle detection device according to claim 1, wherein the one or more processors are further programmed to:

detect an extremum of the first output signal, and identify the magnetic pole sensed by the first magnetic sensor based on the detected extremum and extremum data set in advance.

3. A rotation angle detection device comprising: a detection rotor rotating in accordance with rotation of a rotating body and provided with a plurality of magnetic poles; a first magnetic sensor outputting, in accordance with the rotation of the detection rotor, a first output signal that is a sinusoidal signal serving as a reference; and a second magnetic sensor outputting, in accordance with the rotation of the detection rotor, a second output signal that is a sinusoidal signal having a predetermined phase difference with respect to the first output signal; and detecting a rotation angle of the rotating body based on the first output signal and the second output signal of the first magnetic sensor and the second magnetic sensor, the rotation angle detection device further comprising:

a memory configured to store angular widths of the plurality of magnetic poles measured in advance; and one or more processors programmed to:

set, for each magnetic pole pair of the plurality of magnetic poles, a division corresponding to an angular width of the magnetic pole pair, identify, based on the first output signal, a magnetic pole sensed by the first magnetic sensor, compute, based on the first output signal, a first rotation angle that is a rotation angle within the division, compute, based on the second output signal, a second rotation angle that is a rotation angle within the division, compute a first absolute rotation angle of the detection rotor based on the computed first rotation angle, the angular widths of the plurality of magnetic poles stored in the memory, and the identified magnetic pole, compute a second absolute rotation angle of the detection rotor based on the computed second rotation angle, the angular widths of the plurality of magnetic poles stored in the memory, and the identified magnetic pole, and compute a rotation angle of the rotating body based on the computed first absolute rotation angle and the computed second absolute rotation angle, wherein the phase difference between the first output signal and the second output signal is 90°, the first rotation angle is computed based on the first output signal and a polarity of the second output signal, the second rotation angle is computed based on the second output signal and a polarity of the first output signal, and the one or more processors are further programmed to:

compute, as a third output signal value, a value that is in accordance with a first output signal value corresponding to the computed first absolute rotation angle, compute, as a fourth output signal value, a value that is in accordance with a second output signal value corresponding to the computed second absolute rotation angle, and compute the rotation angle of the rotating body based on the third output signal value and the fourth output signal value.

4. The rotation angle detection device according to claim 3, wherein the one or more processors are further programmed to:

detect an extremum of the first output signal, and identify the magnetic pole sensed by the first magnetic sensor based on the detected extremum and extremum data set in advance.

* * * * *

UNITED STATES PATENT AND TRADEMARK OFFICE
CERTIFICATE OF CORRECTION

| | | |
|---|---|---|
| PATENT NO. | : 9,518,844 B2 | Page 1 of 1 |
| APPLICATION NO. | : 13/639294 | |
| DATED | : December 13, 2016 | |
| INVENTOR(S) | : Takeshi Ueda et al. | |

It is certified that error appears in the above-identified patent and that said Letters Patent is hereby corrected as shown below:

On the Title Page

Item (54): change the Title from "ROTATION ANGLE DETECTION DEVICE COMPROMISING" to -- ROTATION ANGLE DETECTION DEVICE --

Signed and Sealed this
Twenty-fifth Day of April, 2017

Michelle K. Lee
*Director of the United States Patent and Trademark Office*